US009035665B2

(12) United States Patent
Riedel

(10) Patent No.: US 9,035,665 B2
(45) Date of Patent: May 19, 2015

(54) DETERMINING LAYER THICKNESS

(75) Inventor: Stephan Riedel, Dresden (DE)

(73) Assignee: PLASTIC LOGIC LIMITED, Cambridge (GB)

( * ) Notice: Subject to any disclaimer, the term of this patent is extended or adjusted under 35 U.S.C. 154(b) by 204 days.

(21) Appl. No.: 13/701,785

(22) PCT Filed: Jun. 3, 2011

(86) PCT No.: PCT/EP2011/059222
§ 371 (c)(1),
(2), (4) Date: Feb. 15, 2013

(87) PCT Pub. No.: WO2011/151459
PCT Pub. Date: Dec. 8, 2011

(65) Prior Publication Data
US 2013/0141120 A1    Jun. 6, 2013

(30) Foreign Application Priority Data

Jun. 4, 2010   (GB) .................................. 1009408.4

(51) Int. Cl.
G01R 27/26    (2006.01)
G01B 7/06     (2006.01)

(52) U.S. Cl.
CPC ... *G01B 7/08* (2013.01); *G01B 7/06* (2013.01)

(58) Field of Classification Search
USPC ......... 324/671, 672, 600, 200, 229, 635, 644, 324/662, 699, 716
See application file for complete search history.

(56) References Cited

U.S. PATENT DOCUMENTS

| 5,198,777 | A | 3/1993 | Masuda et al. |
| 5,760,589 | A | 6/1998 | Katsuie |
| 5,801,538 | A | 9/1998 | Kwon |
| 5,840,936 | A * | 11/1998 | Zasloff et al. ................. 552/521 |
| 6,465,267 | B1 | 10/2002 | Wang et al. |
| 6,841,832 | B1 | 1/2005 | En et al. |
| 7,262,608 | B2 * | 8/2007 | Cheah et al. .................. 324/662 |

FOREIGN PATENT DOCUMENTS

EP    0 097 570 A2    1/1984
JP    2-307002 A     12/1990

OTHER PUBLICATIONS

International Search Report for PCT/EP2011/059222, dated Sep. 6, 2011.
British Search Report for GB 1009408.4, dated Oct. 10, 2012.
(Continued)

*Primary Examiner* — Melissa Koval
*Assistant Examiner* — Trung Nguyen
(74) *Attorney, Agent, or Firm* — Sughrue Mion, PLLC

(57) ABSTRACT

A technique comprising: producing a plurality of devices according to a common production process; and determining the thickness of a layer of one of said plurality of devices using an indicator of a first electrical property dependent on the area of overlap between a first element of the device and a second element of the device partially underlying said first element via said layer, wherein the method further comprises: additionally using an indicator of a second electrical property dependent on the area of overlap between said first element of the device and a third element of the device also partially underlying said first element via said layer, wherein (a) the difference between (i) a measured indicator of said first electrical property, and (ii) a measured indicator of said second electrical property provides a more reliable indicator of the thickness of said layer than (b) an indicator of said first electrical property.

13 Claims, 1 Drawing Sheet

(56) References Cited

OTHER PUBLICATIONS

Linear Functions, High School Entrance Test course—Middle School Year 2 Mathematics Top Level [key points] Sample, [online], Japan, ZKai, Co. Ltd., [Searched on Jan. 28, 2015], AM0200981A-01, Internet, Url:http://www.zkai.co.jp/jr/koritsu/pdf/vm2ty.pdf>.

JPO Office Action dated Feb. 10, 2015 for JPA No. 2013-512940 Partial Translation.

* cited by examiner

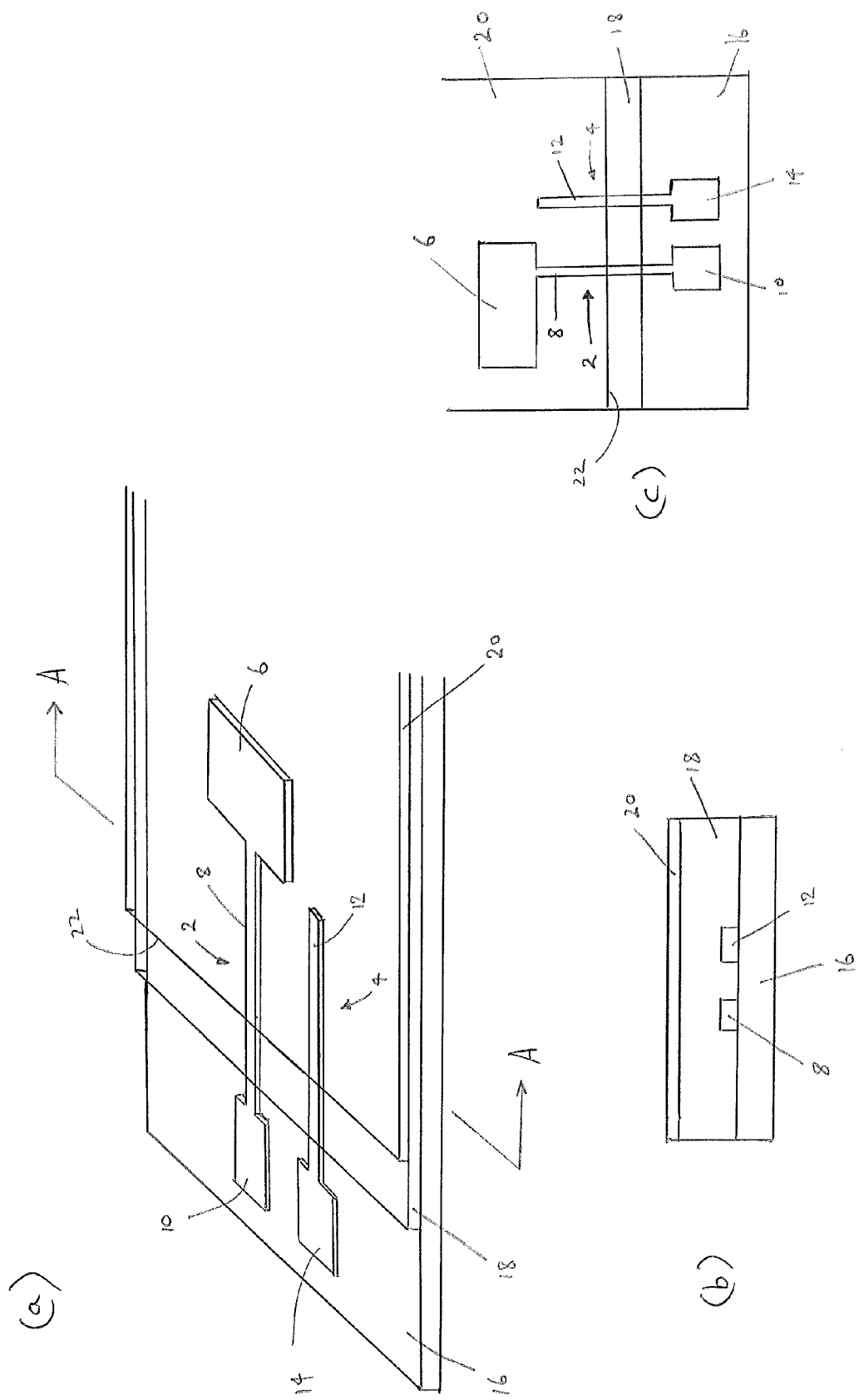

DETERMINING LAYER THICKNESS

CROSS REFERENCE TO RELATED APPLICATIONS

This application is a National Stage of International Application No. PCT/EP2011/059222, filed on Jun. 3, 2011, and claims priority based on British Patent Application No. 1009408.4, filed Jun. 4, 2010, the contents of all of which are incorporated herein by reference in their entirety.

The present invention relates to a technique for determining the thickness of a layer using electrical measurements. In one embodiment, the present invention relates to a technique for measuring the thickness of a layer in one or more devices produced by a mass production process as part of a quality monitoring process.

One technique for measuring the thickness of a layer in a device having at least some dielectric properties is to incorporate into the device two conductive elements on opposite sides of the layer whose thickness is to be measured. If the area of overlap between the two conductive elements via said layer is known, then a measurement of the capacitance between the two conductive elements is an indicator of the thickness of the layer.

However, in order to facilitate the measurement of the capacitance between the two conductive elements, the underlying one of the two conductive elements is arranged such that it extends beyond the edge of the overlying one of the two conductive elements in order to facilitate the application of a measuring probe to the underlying conductive element. The inventors have identified the problem that even though the respective total areas of the two conductive elements may be known to a high degree of accuracy, uncontrollable variations in the extent to which the overlying element overlaps with the partially underlying conductive element can reduce the reliability of the capacitance measurement as an indicator of the thickness of the target layer. Such uncontrollable variations can result, for example, from misalignment of the overlying conductive element in relation to the partially underlying conductive element, and/or distortions in the device after the formation of the two conductive elements.

It is an aim of the present invention to provide a technique by which it is possible to measure the thickness of a layer with a high degree of reliability despite some uncontrollable variation in the extent to which the overlying element overlaps with the partially underlying conductive element.

The present invention provides a method comprising: producing a plurality of devices according to a common production process; and determining the thickness of a layer of one of said plurality of devices using an indicator of a first electrical property dependent on the area of overlap between a first element of the device and a second element of the device partially underlying said first element via said layer, wherein the method further comprises: additionally using an indicator of a second electrical property dependent on the area of overlap between said first element of the device and a third element of the device also partially underlying said first element via said layer, wherein (a) the difference between (i) a measured indicator of said first electrical property, and (ii) a measured indicator of said second electrical property provides a more reliable indicator of the thickness of said layer than (b) an indicator of said first electrical property.

In one embodiment, said first electrical property is the capacitance between said first element and said second element; and said second electrical property is the capacitance between said first element and said third element.

In one embodiment, said third element of the device is configured such that there is (a) a non-zero area difference between the respective areas of the parts of the second and third elements underlying the first element, and wherein the production process produces less variation between said plurality of devices in said non-zero area difference (a) than the production process produces variation within said plurality of devices in (b) the area of overlap between said first and second elements.

In one embodiment, the method further comprises determining the thickness of the layer based on (i) a predetermined value for said non-zero area difference and (ii) the difference between a measured indicator of the capacitance between said first element and said second element, and a measured indicator of the capacitance between said first element and said third element.

In one embodiment, said non-zero area difference is subject to substantially zero variation.

In one embodiment, said second and third elements have portions of substantial identical area underlying an edge portion of said first element and portions of differing area underlying a more inner portion of said first element.

The present invention also provides a plurality of devices produced according to a common production process, wherein each device comprises a layer and first and second measuring elements partially underlying a third element via said layer, wherein (a) the difference between (i) a measured indicator of a first electrical property dependent on the area of overlap between said first element and said third element, and (ii) a measured indicator of a second electrical property dependent on the area of overlap between said second element and said third element provides a more reliable indicator of the thickness of said layer than (b) an indicator of said first electrical property.

In one embodiment, said first electrical property is the capacitance between said first element and said second element; and said second electrical property is the capacitance between said first element and said third element.

In one embodiment, there is (a) a non-zero area difference between the areas of the parts of the first and second elements underlying the third element, which non-zero area difference (a) is subject to less variation within said plurality of devices than (b) the area of overlap between said first and third elements.

In one embodiment, the non-zero area difference is subject to substantially zero variation.

In one embodiment, said first and second measuring elements have portions of substantial identical area underlying an edge portion of said third element and portions of differing area underlying a more inner portion of said third element.

An embodiment of the present invention is described hereunder, by way of example only, with reference to the attached FIG. 1 which illustrates an example of a test structure for use in the embodiment.

FIG. 1(a) shows a perspective view of a section of an electronic device including a test structure according to an embodiment of the present invention.

FIG. 1(b) is cross-sectional view taken through line A-A of FIG. 1; and

FIG. 1(c) is a plan view. In both FIGS. 1(a) and 1(c), parts that are in fact hidden below overlying layers are also shown for the purpose of better illustrating the embodiment.

FIG. 1 shows a small-section of an electronic device produced in large numbers according to a common mass production process.

A substrate 16 has formed thereon an electrically insulating layer 18 which serves an electronic function in the electronic device; for example, it defines the gate dielectric elements of an array of TFTs (not shown). At one edge portion of the insulating layer 18 are provided measuring elements 1, 2 and 20 for use in determining the thickness of the insulating layer 18. The measuring elements include two separate lower conductive elements 2 and 4 underlying the insulating layer and an upper conductive element 20 overlying the insulating layer 18. The lower conductive elements 2, 4 are formed by photolithographic patterning of a continuous deposit of conductive material on the substrate 16. The insulating layer 18 overlies the whole of the two lower conductive elements 2, 4 except for an outer portion of the two lower conductive elements including measurement pads 10 and 14 for the application of a measurement probe. The overlying conductive element 20 is formed so as to lie within the bounds of the underlying insulating layer 18. The upper conductive element 20 also overlies the whole of the lower conductive elements 2 and 4 except for an outer portion of the lower conductive elements 2, 4 including the measurement pads 10 and 14.

Each of the lower conductive elements 2 and 4 comprises a measurement pad 10, 14 and a line 8, 12 extending under the insulating layer 18 and upper conductive element 20. The measurement pad and lines of each lower conductive element 2, 4 are designed to have exactly the same size, shape and orientation; in particular, the lines 8, 12 extend in parallel in a direction substantially perpendicular to the edge of the upper conductive element 20 and have a common width. Only one of the two lower conductive elements has an extra portion 6 whose area is known to a high degree of accuracy and which is located such that it is certain to underlie the upper conductive element 20 regardless of the precise location of the edge of the upper conductive element within the uncontrollable variation range associated with the mass production process used to produce the devices.

When determining the thickness of the insulating layer 18, a measurement is made of the capacitance between the first lower conductive element 2 and the upper conductive element 20, and a measurement is made of the capacitance between the second lower conductive element 4 and the upper conductive element 20. The difference between these two measurements is taken to be the capacitance between extra portion 6 of the first lower conductive element 2 and the upper conductive element 20. Because the area of overlap between the extra portion 6 and the upper conductive element is accurately known to a high degree of reliability (because of the above-mentioned certainty of extra portion 6 being entirely overlapped by the upper conductive element 20), the value of the capacitance between the extra portion 6 and the upper conductive element 20 is a reliable indicator of the thickness of the insulating layer 18.

The difference between the above-mentioned two capacitance measurements is exactly the capacitance between extra portion 6 of the first lower conductive element 2 and the upper conductive element 20 only if the edge of the upper conductive element 20 runs exactly perpendicular to the direction of the lines 8 and 12 (i.e. only if the area of overlap between line 8 and the upper conductive element is exactly the same as the area of overlap between line 12 and the upper conductive element). However, even if the mass production process produces some uncontrollable variation in the angle between the direction of the edge of the upper conductive element 20 and the direction of lines 8 and 12, the above-described technique can still provide a relatively reliable determination of the thickness of the dielectric layer 18 provided that (a) the range of variation of the area difference between (i) the area of overlap between line 8 and the upper conductive element 20 and (ii) the area of overlap between line 12 and the upper conductive element 20, is less than the range of variation of the area of overlap between the line 8 and the upper conductive element 20. The variation range (a) is the difference between the smallest area difference and largest area difference that could result from the production process; and the variation range (b) is the difference between the smallest area of overlap and the largest area of overlap that could result from the production process. In other words, the above-described technique can still provide a relatively reliable determination of the thickness of the dielectric layer 18 provided that (a) the range of variation of the difference between (i) the area of overlap between line 8 and the upper conductive element 20 and (ii) the area of overlap between line 12 and the upper conductive element 20, is known to a greater degree of accuracy than (b) the area of overlap between the line 8 and the upper conductive element 20.

For the description of the above embodiment, we have chosen the example of an insulating layer as the layer whose thickness is to be determined. However, the same technique is also useful for determining the thickness of other types of layers that have at least some dielectric properties, such as semiconductor layers.

Also, for the description of the above embodiment, we have chosen the example of determining the layer thickness on the basis of capacitance measurements. However, the same kind of technique is also applicable, for example, in the case where the layer thickness is determined based on measurement(s) of other electrical properties dependent on the area of overlap between two conductive elements, such as measurement(s) of the vertical area specific conductivity between two conductive elements separated by a conductive or semiconductive layer having a relatively high resistance (low conductivity).

In addition to any modifications explicitly mentioned above, it will be evident to a person skilled in the art that various other modifications of the described embodiment may be made within the scope of the invention.

The invention claimed is:

1. A method comprising:
producing a plurality of devices according to a common production process, wherein each of said plurality of devices comprises an area of overlap between a first element and a second element via a layer having a thickness, and an area of overlap between said first element and a third element via said layer; and
determining the thickness of said layer using an indicator of a first electrical property dependent on said area of overlap between said first element and said second element via said layer, and an indicator of a second electrical property dependent on the area of overlap between said first element and said third element via said layer, wherein (a) a difference between (i) a measured indicator of said first electrical property, and (ii) a measured indicator of said second electrical property provides a more reliable indicator of the thickness of said layer than (b) an indicator of said first electrical property.

2. The method according to claim 1, wherein said first electrical property is capacitance between said first element and said second element; and said second electrical property is capacitance between said first element and said third element.

3. The method according to claim 2, wherein said third element of the device is configured such that there is a non-zero area difference between the area of overlap between the first and second elements and the area of overlap between the first and third elements, and wherein the production process produces less variation between said plurality of devices in said non-zero area difference than the production process produces variation within said plurality of devices in the area of overlap between said first and second elements.

4. The method according to claim 3, comprising determining the thickness of the layer based on a predetermined value for said non-zero area difference and a difference between a measured indicator of the capacitance between said first element and said second element, and a measured indicator of the capacitance between said first element and said third element.

5. The method according to claim 3, wherein said non-zero area difference is subject to substantially zero variation.

6. The method according to claim 1, wherein said second and third elements have portions of substantially identical area of overlap with an edge portion of said first element adjacent to an edge of said first element, and portions of differing areas of overlap with a more inner portion of said first element.

7. The method according to claim 6, wherein the second and third elements comprise lines of common width and common orientation overlapping with said edge portion of the first element and extending beyond said edge of the first element.

8. A plurality of devices produced according to a common production process,
wherein each device comprises a layer having a thickness, and first, second and third elements,
wherein there is an area of overlap between said first element and said second element via said layer and an area of overlap between said first element and said third element via said layer, and
wherein (a) a difference between (i) a measured indicator of a first electrical property dependent on the area of overlap between said second element and said first element, and (ii) a measured indicator of a second electrical property dependent on the area of overlap between said third element and said first element provides a more reliable indicator of the thickness of said layer than (b) an indicator of said first electrical property.

9. The plurality of devices according to claim 8, wherein said first electrical property is capacitance between said first element and said second element; and said second electrical property is capacitance between said first element and said third element.

10. The plurality of devices according to claim 9, wherein there is a non-zero area difference between the area of overlap between the first and second elements and the area of overlap between the first and third elements, which non-zero area difference is subject to less variation within said plurality of devices than the area of overlap between said first and third elements.

11. The plurality of devices according to claim 10, wherein the non-zero area difference is subject to substantially zero variation.

12. The plurality of devices according to claim 10, wherein said second and third elements have portions of substantially identical area of overlap with an edge portion of said first element adjacent to an edge of said first element, and portions of differing area of overlap with a more inner portion of said first element.

13. The plurality of devices according to claim 12, wherein the second and third elements comprise lines of common width and common orientation overlapping with said edge portion of the first element and extending beyond said edge of the first element.

* * * * *